Figure 1:
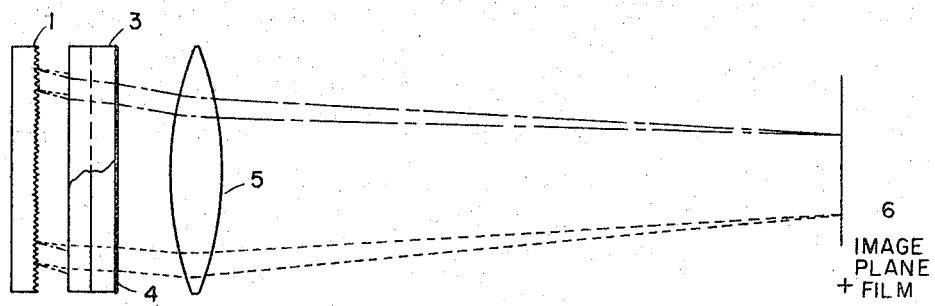

March 21, 1967 T. F. McHENRY 3,309,957
CINESPECTROGRAPH SPECTRUM ORDER SEPARATION
Filed May 21, 1963

——————— 350–600 mµ
— — — — — — 350 mµ
— · — · — · — 600 mµ

INVENTOR.
THOMAS F. MCHENRY
BY
*Robert Ames Norton*
ATTORNEY

United States Patent Office 3,309,957
Patented Mar. 21, 1967

3,309,957
CINESPECTROGRAPH SPECTRUM ORDER SEPARATION
Thomas F. McHenry, Norwalk, Conn., assignor to Barnes Engineering Company, Stamford, Conn., a corporation of Delaware
Filed May 21, 1963, Ser. No. 281,886
6 Claims. (Cl. 88—14)

This invention relates to an improved cinespectrograph and more particularly to instruments using gratings.

There is a considerable field for a light, readily aimable spectrograph which can record spectra in rapid sequence on motion picture film. One practical use is in the recording of successive spectra from re-entering objects such as nose cones. The time during which a nose cone emits radiations is fairly short and the nature of the radiation changes rapidly from second to second. When weight and compactness are not problems as, for example, when the observations are taken on shipboard, it has been feasible to employ cameras using relatively large film or plates and to record a number of successive spectra at intervals. When the weather is clear such observations give excellent records but sometimes the weather is not propitious and so air borne spectrographs have been used. These are of the cinespectrograph type to save weight and space and preferably use gratings for spectrum formation such as, for example, transmission gratings. This type of instrument presents certain problems which will be set out below and it is with an improved instrument of this type that the present invention deals.

The need for lightness and compactness has been noted above, which dictates the use of gratings rather than prisms. However, this in turn presents certain optical problems due to the fact that it is normally or at least frequently necessary to record spectra extending from the ultraviolet through the visible. This constitutes more than an octave and so a problem has been raised by the higher order spectra produced, for example, a grating blazed from 350 mµ to 700 mµ. A second order spectrum is produced from 175 mµ to 35 mµ. If observation is to be extended down to 300 mµ in the ultraviolet, which is often done, this second order spectrum degrades the resolution. The problem has not been so serious as to preclude the use of cinespectrographs, but the loss of resolution or blurring has been an undesired factor which has limited the precision of some of the observations. On of the important advantages of the present invention is that this problem of second order spectra is completely solved in an optical system of extreme simplicity and ruggedness. As an incident thereto there are some other advantages which will be referred to below. The improved resolution and lack of blurring where there is an overlap of spectra is achieved without any sacrifice in resolution at other wavelengths and without interference with desirable compactness and light weight of the instrument.

Essentially the present invention utilizes one or two transmission gratings and two wedge filters which separate completely the orders of spectra and at the same time displace the physical position of the spectra on the plane of the recording film. The invention will be described in conjunction with a cinespectrograph to operate from 300 mµ to 700 mµ, but it should be understood that the invention is not limited to these particular wavelength ranges which happen to be convenient for nose cone spectral investigation. The invention is equally useful for obtaining spectra of other wavelength ranges, though it is more difficult to record the spectra far in the infrared in the form of spectrograms on film since film, even when specially sensitized, does not record very far into the infrared. The present invention, however, is not limited to the use of film as a recording means and any suitable detecting mechanism for the particular wavelength range to be investigated may be used.

Figure 2:
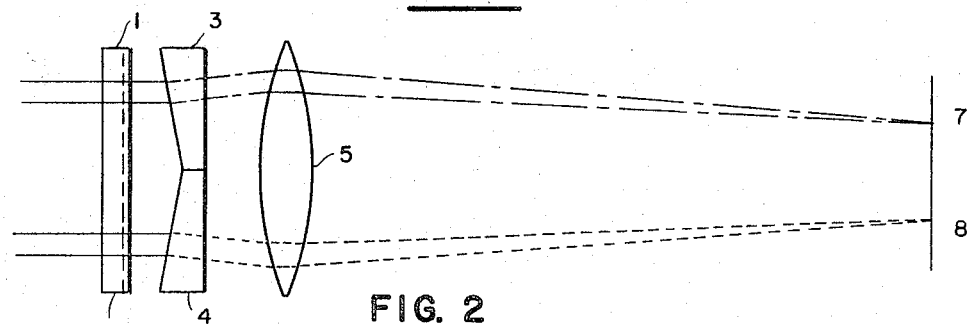

The invention will also be described in detail in connection with the drawings in which:
FIGS. 1 and 2 are optical diagrammatic cross-sections at right angles to each other, and
FIG. 3 is a plan view of a single frame of motion picture film.

The spectrograph consists of one or two transmission gratings 1 and 2. It is feasible to use a single grating, but two are shown where the maximum of sharp spectral resolution is desired. Where a single grating is used it is blazed for 350 mµ to 700 mµ. Radiation passing through the grating or gratings is diffracted in the normal manner, producing not only the order of spectra for which the grating is blazed but also higher orders. Behind the gratings are two wedge filters 3 and 4. The first wedge passes a wavelength range from 300 mµ to 480 mµ, the second from 450 mµ to 700 mµ. The spectral rays pass through an objective 5, usually compound, which should be of suitable design to give high resolution in the entire spectral region. Usually two spectra are imaged on one-half of the recording film 6. Wedge 3 places its images at the point marked 7 and the image resulting on the film is referred to as image No. 2. The other wedge 4, which passes radiation from 450 mµ to 700 mµ, images at 8 and this is shown on FIG. 3 as image No. 1. The gratings are ruled with lines at right anles to the plane of the paper in FIG. 1, and parallel to the plane of the paper in FIG. 2. This is indicated diagrammatically with gross exaggeration by a phantom line showing the first ruling.

Figure 3:
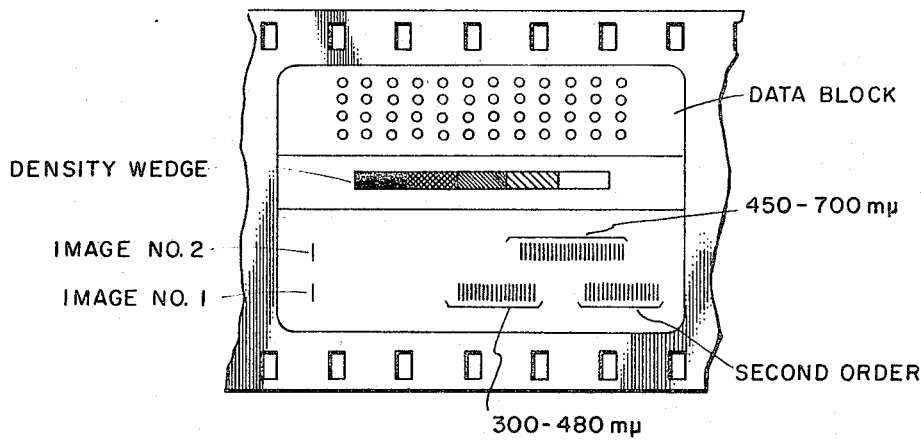

It will be seen on FIG. 3 that the second order spectrum from wedge 4 is displaced from the spectrogram of the first order and that it is also physically displaced from the first order spectrum which extends from 300 mµ to 480 mµ. The first order spectrum from 450 mµ to 700 mµ appears as a continuous spectrum. There is no confusion or blurring due to different orders of spectra appearing in the same place. At the same time it will be noted that there is a slight overlap in transmission of the two filters from 450 mµ to 480 mµ. This portion of the spectrum appears both in image No. 1 and image No. 2, and is useful for calibration purposes to assure the same density in both images. It is, of course, possible to separate the orders of spectra without any overlap or even with a blank spot by the choice of suitable filters. However, it is just as easy to use filters with a slight overlap and the additional calibration feature is obtained without additional equipment; therefore, this modification is preferred.

It is customary in cinespectrographs to record certain other data on each frame. For example, frame rate exposure, time, and the like, together with a density wedge for quantitative data interpretation. This is usually shown by a record of lights in the case of the data other than the density wedge, and a typical record is illustrated at the top of the film in FIG. 3. As this recording of data is conventional in cinespectrographs, it will not be described further.

The operation of the cinespectrograph occurs normally and is not changed by the present invention. A suitable frame rate is chosen and the time markers are started at a particular instant. The cinespectrograph is aimed to pick up and follow a re-entering nose cone, and this is done in the normal conventional manner in the present instrument. After observation the film is developed, and each frame shows the spectrum at a particular instant after starting the timing. The data is then handled as are any other spectrograph observations, but the advantage is obtained that there is no blurring of one order of spectrum by a higher order.

Reference has been made to the use of one or more transmission gratings. Where the range of wavelengths to be handled is not too great, for example, only a little over an octave in the illustrated example, a single grating is quite satisfactory. However, if a wider range of wavelengths is to be observed, there is an advantage in using more than one grating as blazing, and hence resolution, can be maintained more nearly at the optimum.

It is an important practical advantage of the present invention that the instrument contains no moving parts other than shutter and film transport, which is necessary in any cinespectrograph. A very rugged instrument is thus made possible, and it is also readily possible to provide for interchangeable filter wedges and gratings so that the same basic instrument may be used for different wavelength ranges. When a range is used which extends for a considerable distance into the infrared, the simple use of a film as a spectral radiation detector becomes impossible, at least for part of the spectral recording. It is possible to space infrared detectors in any array of different detectors responding to different spectral wavelengths which correspond to their position. The nature of the record in the infrared is, of course, somewhat different from that of a film. However, the use of an array of detectors oriented to receive different spectral bands is a well known device in infrared technology and, of course, it is usable in the present invention. The separation of orders of spectra is effected just as precisely as if a film were used as the radiation detector. Putting it another way, the present invention really ceases when the two images of the different spectra are produced. The nature of the radiations concerned determine the detectors to be used.

I claim:
1. A spectrograph comprising in combination and in optical alignment,
   (a) at least one grating, a plurality of filter wedges receiving rays from said gratings and having transmission characteristics for separating spectral orders and for deviating rays from the respective spectral orders along separate divergent paths,
   (b) means for imaging the spectral orders after passing through each wedge onto separate locations in a predetermined image plane, and
   (c) radiation detectors located to receive the spectral image and responsive to the particular radiations in the spectra.
2. An instrument according to claim 1 in which the gratings are transmission gratings.
3. An instrument according to claim 1 in which the radiation detectors of (c) are formed of a photographic film sensitive to the spectral ranges involved whereby the spectra through the wedges are photographed displaced from each other.
4. An instrument according to claim 2 in which the radiation detectors of (c) are formed of a photographic film sensitive to the spectral ranges involved whereby the spectra through the wedges are photographed displaced from each other.
5. An instrument according to claim 1 in which the radiation transmission band width of the filter wedges exhibit a slight overlap of less than an octave whereby a portion of the spectral lines in the images in the image plane correspond to the same wavelengths.
6. An instrument according to claim 2 in which the radiation transmission band width of the filter wedges exhibit a slight overlap of less than an octave whereby a portion of the spectral lines in the images in the image plane correspond to the same wavelengths.

References Cited by the Examiner
FOREIGN PATENTS
766,909   1/1957   Great Britain.

JEWELL H. PEDERSEN, *Primary Examiner.*
RONALD L. WIBERT, *Assistant Examiner.*